United States Patent
Chen et al.

(10) Patent No.: US 10,330,563 B2
(45) Date of Patent: Jun. 25, 2019

(54) FRACTURE MECHANICS BASED METHOD FOR COMPOSITE DAMAGE TOLERANCE CRITERIA

(71) Applicant: Sikorsky Aircraft Corporation, Stratford, CT (US)

(72) Inventors: Yih-Farn Chen, Shelton, CT (US); Leon M. Meyer, Harwinton, CT (US); Fran Byrnes, White Plains, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 122 days.

(21) Appl. No.: 15/128,316

(22) PCT Filed: Mar. 26, 2014

(86) PCT No.: PCT/US2014/031800
§ 371 (c)(1),
(2) Date: Sep. 22, 2016

(87) PCT Pub. No.: WO2015/147810
PCT Pub. Date: Oct. 1, 2015

(65) Prior Publication Data
US 2017/0108402 A1 Apr. 20, 2017

(51) Int. Cl.
*G01M 5/00* (2006.01)
*G06F 17/50* (2006.01)
(52) U.S. Cl.
CPC ........ *G01M 5/0033* (2013.01); *G01M 5/0016* (2013.01); *G06F 17/5018* (2013.01); *G06F 2217/44* (2013.01)
(58) Field of Classification Search
CPC .............. G01M 5/0016; G01M 5/0033; G06F 17/5018; G06F 2217/44
(Continued)

(56) References Cited

U.S. PATENT DOCUMENTS 7,006,947 B2 2/2006 Tryon, III et al.
7,303,374 B2 12/2007 Li et al.
(Continued)

FOREIGN PATENT DOCUMENTS

| CN | 102175449 B | 7/2012 |
| JP | 2010145168 A | 7/2010 |
| JP | 2011095178 A | 5/2011 |
| JP | 2013011504 A | 1/2013 |
| WO | 2012003027 A1 | 1/2012 |

OTHER PUBLICATIONS

Harold K. Reddick, Jr., Year 1983, "Safe-Life and Damage-Tolerant Design Approaches for Helicopter Structures", Applied Technology Laboratory US Army Research and Technology Laboratories, pp. 129-151.*

(Continued)

*Primary Examiner* — John H Le
(74) *Attorney, Agent, or Firm* — Cantor Colburn LLP

(57) ABSTRACT

A system and method to substantiate safe-life criteria of a structure with an anomaly includes a flaw in a critical loaded region of a test structure; a processor; and memory having instructions stored thereon that, when executed by the processor, cause the system to receive first signals indicative of strain energy release rates (SERR) for the flaw at the critical loaded region of a test structure; fit the first signals for the flaw SERR to a Benzeggah-Kenane (B-K) mixed mode curve shape; determine values indicative of B-K criteria of the test structure in response to the fitting of the first signals; receive second signals indicative of SERR for the production structure; and compare the second signals with the B-K criteria of the test structure to substantiate the safe-life criteria.

20 Claims, 3 Drawing Sheets

(58) Field of Classification Search
USPC .............. 702/34, 185; 73/799, 827; 428/119; 703/2, 6, 7; 156/227
See application file for complete search history.

(56) References Cited

U.S. PATENT DOCUMENTS

| | | |
|---|---|---|
| 7,505,885 B2 | 3/2009 | Deobald et al. |
| 7,516,053 B1 | 4/2009 | Lu |
| 2002/0139194 A1 | 10/2002 | Mars |
| 2006/0009951 A1 | 1/2006 | Tryon, III et al. |
| 2011/0054840 A1 | 3/2011 | Hively et al. |
| 2013/0090902 A1 | 4/2013 | Yao et al. |
| 2014/0216638 A1* | 8/2014 | Vetter ............... B29D 99/0014 156/227 |

OTHER PUBLICATIONS

European Search Report; International Application No. PCT/US2014031800; dated Nov. 11, 2017; 1 Page.

M.L. Benzeggargh, et at.,"Measurement of Mixed-Mode Delamination Fracture Toughness of Unidirectional Glass/Epoxy Composites With Mixed-Mode Bending Apparatus", Composites Science and Technology, 1996, p. 1-11.

Notification of Transmittal of the International Search Report and the Written Opinion; International Application No. PCT/US2014/031800; International Filing Date Mar. 26, 2014; dated Aug. 8, 2014; 10 Pages.

Krueger, R. "Application of Benchmark Examples to Assess the Single and Mixed-Mode Static Delamination Propagation Capabilities in ANSYS", NASA/CR-2012-217588, Jul. 2012, 71 Pages, USA.

\* cited by examiner

FRACTURE MECHANICS BASED METHOD FOR COMPOSITE DAMAGE TOLERANCE CRITERIA

CROSS REFERENCE TO RELATED APPLICATIONS

The present application is a National Stage Application claiming priority to Patent Application PCT/US2014/031800 filed on Mar. 26, 2014, the contents of which are incorporated herein by reference in their entirety.

BACKGROUND

The subject matter disclosed herein relates generally to the field of finite element analysis of composite materials and, more particularly, to a system and method of fracture mechanics based finite element analysis of a thick composite primary structure in order to substantiate serviceability of nonconforming production parts.

DESCRIPTION OF RELATED ART

During manufacturing of aircraft component structures, manufacturing anomalies are sometimes inadvertently introduced. For example, manufacturing of composite structures like spars, flex beams and cuffs can introduce unwanted inter-laminar anomalies within the structure. In order to determine if these inter-laminar anomalies may affect structural performance under fatigue stress, fracture-mechanics-based methods can be used together with coupon test data that defines acceptance criteria. However, coupon tests with high confidence, often not readily available, can be very expensive and time-consuming to acquire due to the complexity of testing the multiplicity of defect sizes, shapes, locations, depths, and proximity (to other defects in the part or geometric features of the part). There are also concerns whether the simplified coupon configurations can be fully representative of the actual complex structure. Therefore, ad-hoc conservative damage evaluation methods are used instead and often lead to scrapping parts that are capable of safe flight. A method for a fracture mechanics based analysis together with safe-life test-proven criteria would be well received in the art.

BRIEF SUMMARY

According to one aspect of the invention, a system to substantiate safe-life criteria of a composite structure with an anomaly includes a flaw in a critical loaded region of a test composite structure; a processor; and memory having instructions stored thereon that, when executed by the processor, cause the system to receive first signals indicative of strain energy release rates (SERR) for the flaw at the critical loaded region of a test composite structure; fit the first signals for the flaw SERR to a Benzeggah-Kenane (B-K) mixed mode curve shape; determine values indicative of B-K criteria of the test composite structure in response to the fitting of the first signals; receive second signals indicative of SERR for the production composite structure; and compare the second signals with the B-K criteria of the test structure to substantiate the safe-life criteria.

In addition to one or more of the features described above, or as an alternative, further embodiments could include a flaw that is embedded at the critical loaded region.

In addition to one or more of the features described above, or as an alternative, further embodiments could include a critical loaded region that is configured to be subjected to qualification test load conditions.

In addition to one or more of the features described above, or as an alternative, further embodiments could include B-K criteria that are indicative of allowable threshold values for a test composite structure.

In addition to one or more of the features described above, or as an alternative, further embodiments could include a processor that is configured to determine whether the second signals are within limits of the B-K criteria of the test composite structure.

In addition to one or more of the features described above, or as an alternative, further embodiments could include a processor that is configured to receive third signals indicative of SERR values of a predetermined material substantially similar to a material of the test composite structure.

In addition to one or more of the features described above, or as an alternative, further embodiments could include a processor that is configured to determine the production composite structure SERR from finite element analysis with virtual closure crack techniques.

In addition to one or more of the features described above, or as an alternative, further embodiments could include a processor that is configured to determine the test composite structure SERR from finite element analysis with virtual closure crack techniques.

In addition to one or more of the features described above, or as an alternative, further embodiments could include a flaw that comprises Teflon films, Teflon rods, or planar voids.

According to another aspect of the invention, a method to substantiate safe-life criteria of a nonconforming composite structure includes receiving first signals indicative of strain energy release rates (SERR) for a flaw at a critical loaded region of a composite structure; fitting the first signals for the flaw SERR to a Benzeggah-Kenane (B-K) mixed mode curve shape; determining values indicative of B-K criteria of the test composite structure in response to the fitting of the first signals; receiving second signals indicative of SERR for a production composite structure; and comparing the second signals with the B-K criteria of the test composite structure to substantiate the safe-life criteria.

In addition to one or more of the features described above, or as an alternative, further embodiments could include embedding the flaw at the critical loaded region.

In addition to one or more of the features described above, or as an alternative, further embodiments could include subjecting the critical loaded region to qualification test load conditions in response to the embedding of the flaw.

In addition to one or more of the features described above, or as an alternative, further embodiments could include the B-K criteria being indicative of allowable threshold values for a composite structure.

In addition to one or more of the features described above, or as an alternative, further embodiments could include comparing of the second signals further comprises determining whether the second signals are within limits of the B-K criteria.

In addition to one or more of the features described above, or as an alternative, further embodiments could include receiving third signals indicative of SERR values of a predetermined material substantially similar to a material of the test composite structure.

In addition to one or more of the features described above, or as an alternative, further embodiments could include determining the production composite structure SERR from finite element analysis with virtual closure crack techniques.

In addition to one or more of the features described above, or as an alternative, further embodiments could include determining the test composite structure SERR from finite element analysis with virtual closure crack techniques.

In addition to one or more of the features described above, or as an alternative, further embodiments could include receiving the production composite structure SERR for a critical loaded region with an anomaly.

In addition to one or more of the features described above, or as an alternative, further embodiments could include a composite structure that is a blade.

In addition to one or more of the features described above, or as an alternative, further embodiments could include a flaw that comprises Teflon films, Teflon rods, or planar voids.

Technical effects of this invention include a method to provide realistic damage tolerance criteria for composite structures that replace current existing ad-hoc conservative criteria. The method saves unnecessary scrap due to conservative criteria and lowers waste.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several figures:

DETAILED DESCRIPTION

Figure 1:
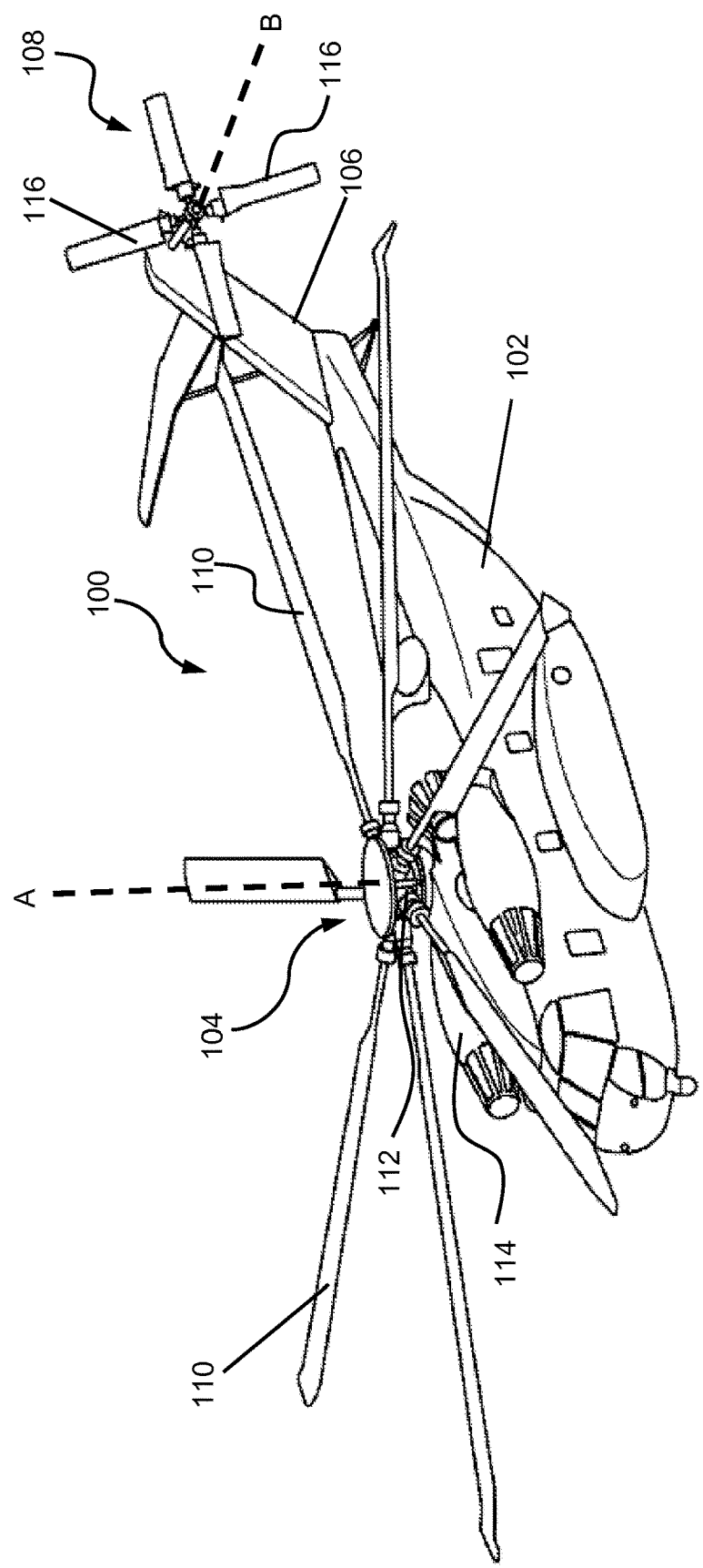
FIG. 1 is a perspective view of an exemplary aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use with an algorithm for flaw evaluation of defects in a composite structure, such as, e.g., a rotor blade, according to an embodiment of the invention. In an embodiment, the algorithm utilizes fracture mechanics based finite element analysis of a rotor blade spar. Finite element analysis is used to determine strain energy release rates of a delamination in a critically loaded region of a qualification test specimen for substantiation of nonconforming spars. As illustrated, rotary-wing aircraft 100 includes an airframe 102 having a main rotor assembly 104 and an extending tail 106 which mounts an anti-torque system, such as a tail rotor assembly 108. In embodiments, the anti-torque system may include a translational thrust system, a pusher propeller, a rotor propulsion system, or similar. The main rotor assembly 104 includes a plurality of rotor blades 110 mounted to a rotor hub 112 that rotates about axis A. Also, tail rotor assembly 108 includes a plurality of rotor blades 116 that rotates about axis B. Main rotor assembly 104 and tail rotor assembly 108 are driven to rotate by one or more engines 114 through one or more gearboxes (not shown). Although a particular helicopter blade is illustrated and described in the disclosed embodiment, parts and spars in other configurations and/or machines, such as high speed compound rotary wing aircraft with supplemental translational thrust systems, dual contra-rotating, coaxial rotor system aircraft, tilt-rotors and tilt-wing aircraft, fixed wing aircraft, wind-turbines as well as composite primary structures designed to take fatigue cycling loads, regardless of dynamic, quasi static, or static loading will also benefit from embodiments of the invention.

Figure 2:
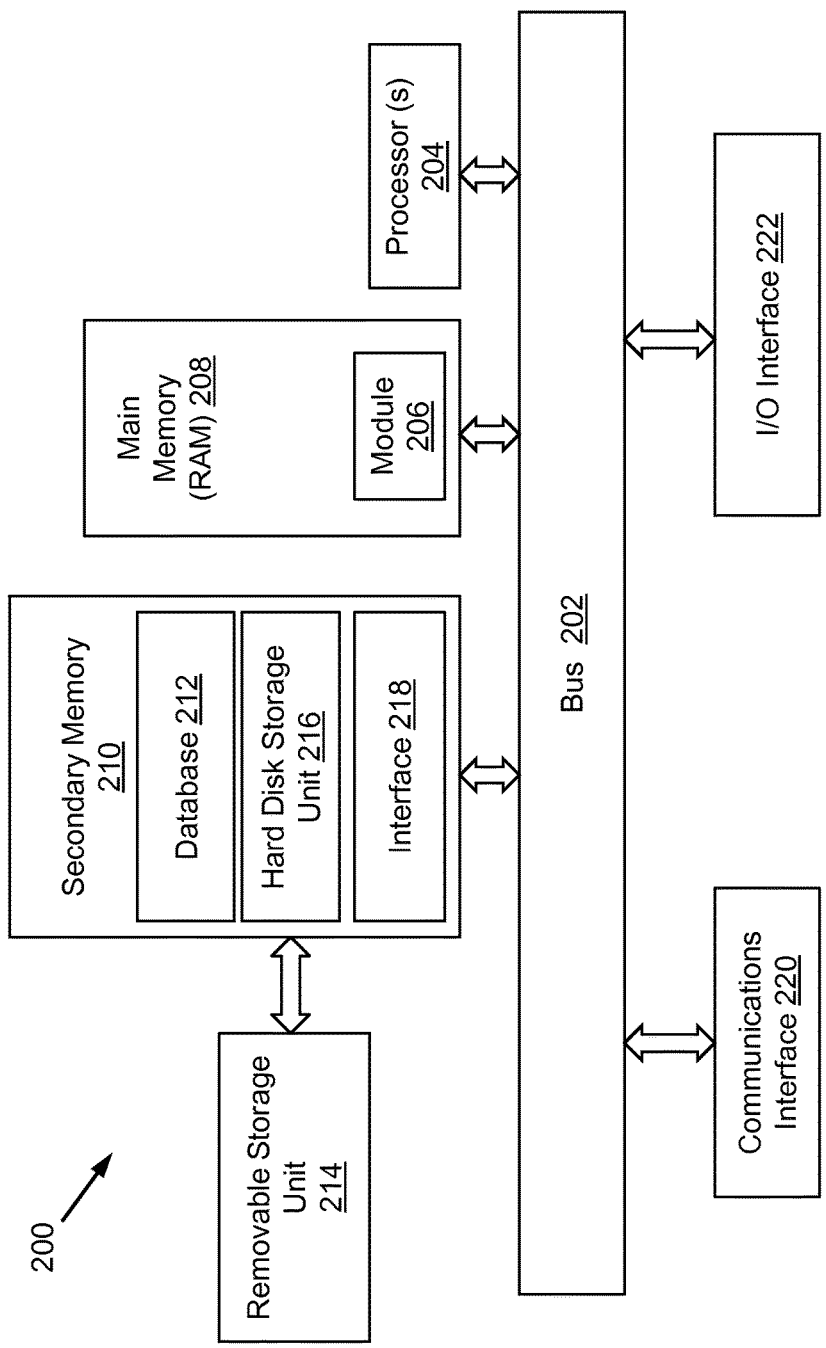
FIG. 2 is a schematic view of an exemplary system for implementing an algorithm for composite material flaw evaluation of a primary structure according to an embodiment of the invention.

FIG. 2 illustrates a schematic block diagram of a computer system 200 for implementing the embodiments described herein. The invention may be implemented using hardware, software or a combination thereof and may be implemented in a computer system 200. Computer system 200 includes one or more processors, such as processor 204. The processor 204 may be any type of processor (CPU), including a general purpose processor, a digital signal processor, a microcontroller, an application specific integrated circuit, a field programmable gate array or the like. The processor 204 is connected to a computer system 200 internal communication bus 202. Computer system 200 also includes a main memory 208 such as random access memory (RAM), and may also include a secondary memory 210. The secondary memory 210 may include, for example, one or more databases 212, a hard disk storage unit 216 and one or more removable storage units 214 representing a floppy disk drive, a magnetic tape drive, an optical disk drive, a removable memory chip (such as an EPROM, or PROM) and associated socket, and the like which allow software and data to be transferred from the removable storage unit 214 to computer system 200. The removable storage unit 214 reads from and/or writes to a hard disk storage unit 216 in a well-known manner. As will be appreciated, the removable storage unit 214 includes a computer usable storage medium having stored therein computer software and/or data.

Computer system 200 includes a communications interface 220 connected to the bus 202. Communications interface 220 allows software and data to be transferred between computer system 200 and external devices. Examples of communications interface 220 may include a modem, a network interface (such as an Ethernet card), a communications port, a PCMCIA slot and card, etc. Software and data transferred via communications interface 220 are in the form of signals which may be electronic, electromagnetic, optical, or other signals capable of being received by communications interface 220. These signals are provided to communications interface 218 in secondary memory 210 via a communications path (i.e., channel) and may be implemented using wire or cable, fiber optics, wired, wireless and other communications channels.

The computer system 200 may also include an I/O interface 222, which provides the computer system 200 to access a display/monitor and the like. In an embodiment, the results and/or pictures of composite damage tolerance based upon the general cohesive material laws are reported to the user via the I/O interface 222. Also, a model containing the Algorithm for composite damage tolerance is stored as executable instructions in module 206 in main memory 208 and/or hard disk storage unit 216 of secondary memory 210. The algorithm, when executed by processor 204, enables the computer system 200 to perform the features of the invention as discussed herein. The main memory 208 may be loaded with one or more application modules 206 that can be executed by one or more processors 204 with or without a user input through the I/O interface 222 to achieve desired tasks.

Figure 3:
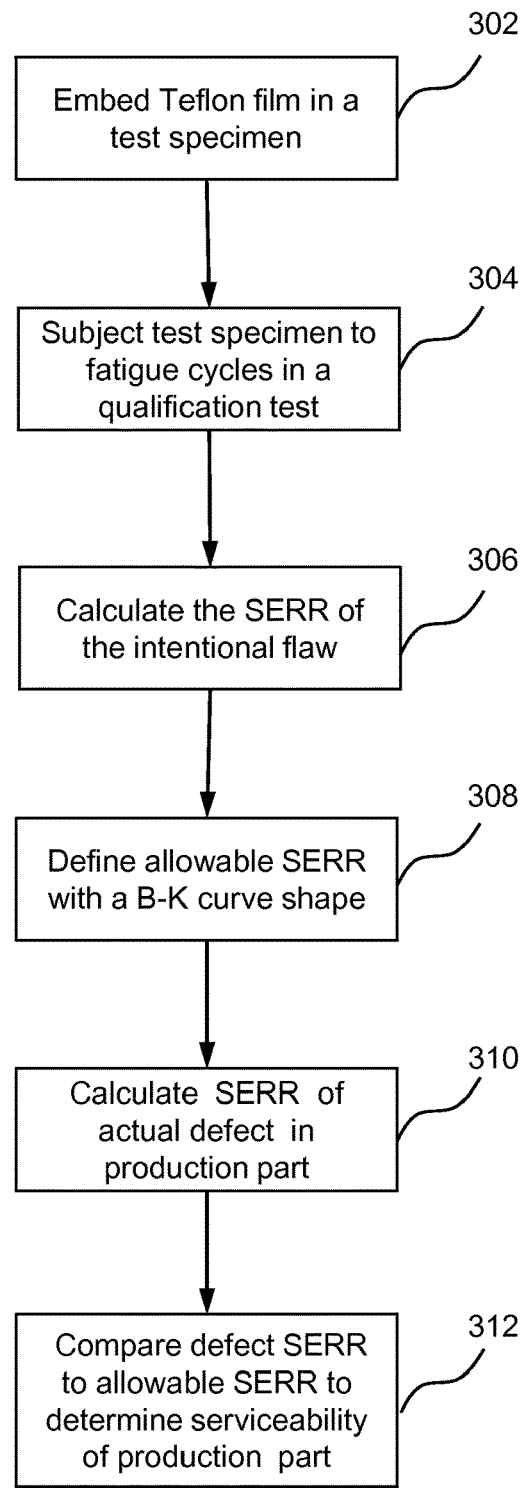
FIG. 3 is a flow chart or method of composite material flaw evaluation according to an embodiment of the invention.

FIG. 3 is a flowchart of a process for composite material flaw evaluation of an example helicopter rotor blade 110 (FIG. 1) according to an embodiment of the invention. The exemplary process depicts a model based algorithm that includes a fracture mechanics based Finite Element Analysis (FEA) model in order to substantiate flaws in nonconforming spars of rotor blades. Nonconforming spars can include voids and delamination in the spar. The algorithm may be associated with computer system 200 (FIG. 2) and is executed by the processor 204. As such, FIG. 2 is also being referenced in the description of the exemplary process of FIG. 3.

As shown, the exemplary process is initiated in 302 by embedding a flaw into a rotor blade test specimen that will undergo qualification tests. In an embodiment, embedded artificial flaws such as using Teflon films and rods are embedded in a critical loaded region of the rotor blade test specimen in order to simulate a manufacturing anomaly. Interfacial cracks between ply layers in the embedded test specimen are delaminations. Embedded Teflon films, Teflon rods, and planar voids are considered as flaws in the composite rotor blade. Depending on the loading of the composite rotor blade, the embedded test specimen may be used to establish allowable flaws for a variety of mixed-mode fracture modes such as opening, shearing and tearing in the rotor blade. In an embodiment, the rotor blade test specimen is made from unidirectional prepregs such as, for example, IM7/8552 prepreg tape, but woven prepreg based composites may also be used. In 304, the embedded test specimen is subjected to qualification test load conditions in order to subject the test specimen to fatigue cycles. In an embodiment, load conditions are used to simulate various flight load regimes of aircraft 100 (FIG. 1). The embedded test specimen is subjected to fatigue cycles in order to determine that, in an example, the Teflon flaw will not grow at any load up to and including a maximum flight load, after a minimum threshold flight hours or time of flight in the field. These loads represent flatwise bending (NB), edgewise bending (EB), torsion (TB), flatwise shear force (NS), edgewise shear force (ES) and centrifugal force (CF).

In 306, the strain energy release rate (SERR) of the embedded test specimen with a Teflon flaw at the critical loaded region is calculated or determined using FEA with a Virtual Crack Closure Technique (VCCT) options. The finite element analysis is performed with a commercially available finite element analysis program such as, for example, MARC available from MSC Software or ANSYS simulation software from ANSYS, Inc. SERR is the energy per unit area available in an elastic body to create a crack. It is defined as:

$$G = \partial W / \partial A - \partial U / \partial A, \quad (1)$$

where:
W is the work done by external forces;
U is the strain energy stored in the body; and
A is the crack surface area.

When G is greater than a critical value, denoted by $G_c$, the crack grows and energy is released. The SERR associated with each fracture mode can be expressed as $$G_I = \frac{\lim}{2\Delta A \to 0} \int_A \sigma_z u_z \, dA, \quad (2)$$

$$G_{II} = \frac{\lim}{2\Delta A \to 0} \int_A \sigma_{yz} u_y \, dA, \quad (3)$$

$$G_{III} = \frac{\lim}{2\Delta A \to 0} \int_A \sigma_{xz} u_x \, dA, \quad (4)$$

where σ and u are stresses and displacements for respective opening mode ($G_I$), sliding/shearing mode ($G_{II}$) and tearing ($G_{III}$) modes. The total strain energy release rate is given by a sum of three components, $G_T = G_I + G_{II} + G_{III}$. The total strain energy release rate is the sum of each of the opening, shearing and tearing fracture modes.

The energy required to open a crack is equal to the energy required to close the crack. The VCCT technique utilizes this principle in the finite element analysis of programs, for example, MARC or ANSYS to calculate an SERR of the test specimen at crack tips. In an embodiment, the VCCT technique can be applied according to the method disclosed in a non-patent literature publication authored by Ronald Krueger entitled "Virtual crack Closure Technique, Applied Mechanics Review, Vol. 57, March 2004, which is herein incorporated by reference.

In 308, the resulting SERR of a Teflon flaw at the critical loaded region is fit to a generic Benzeggah-Kenane (B-K) mixed mode curve shape to arrive at B-K safe-life criteria. A B-K mixed mode curve shape defines SERR values obtained through coupon tests for predetermined materials, which are substantially similar to the test specimen, that are subjected to mixed-load conditions. The resulting SERR of the Teflon flaw is fit to the B-K curve shape in order to arrive at an allowable threshold value of SERR that can meet test-proven safe-life criteria (i.e., B-K criteria). Also, in 310, the SERR of actual manufacturing anomalies in a production rotor blade (i.e., without embedded Teflon films) are calculated. The SERR of production blades is calculated or determined through FEA with VCCT options, as depicted in previous steps 306-308. In embodiments, the SERR of production blades are determined for critical regions and less critical regions.

In 312, SERR for a manufacturing anomaly in a production blade is compared to the SERR values of the B-K criteria obtained from the embedded Teflon flaw as described above in 308. Values of SERR for the production blade within the limits of the B-K criteria meet the test-proven safe-life criteria and substantiate operability of the non-conforming blades in the field. Conventional methods utilize B-K criteria obtained through coupon test data such as, for example, Double-Cantilever Beam (DCB), End-Notched Flexure (ENF) and Mixed-Mode Bending (MMB) tests. However, the present invention proposes a novel method of determining B-K criteria utilizing the SERR values of embedded Teflon flaws described above which results in an easier and accurate method of substantiating serviceability of nonconforming production parts.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to rotorcraft, and can be used in fixed and movable composite structures such as blades and spars in fixed wing vehicles, land vehicles, sea-based vehicles and fixed composite structures having blades or spars. Many modifications, variations, alterations, substitutions or equivalent arrangements not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method to substantiate safe-life criteria of a nonconforming composite structure, comprising:
    receiving, with a processor, first signals indicative of strain energy release rates (SERR) for an artificial flaw at a critical loaded region of a test composite structure, in response to the artificial flaw being embedded at the critical loaded region of the test composite structure;
    fitting, with the processor, the first signals for the artificial flaw SERR to a Benzeggah-Kenane (B-K) mixed mode curve shape;
    determining, with the processor, values indicative of B-K criteria of the test composite structure in response to the fitting of the first signals;
    receiving, with the processor, second signals indicative of SERR for a production composite structure;
    comparing, with the processor, the second signals with the B-K criteria of the test composite structure to substantiate the safe-life criteria;
    wherein the production composite structure is used on an aircraft in response to the comparison substantiating that the production composite structure meets the safe-life criteria.

2. The method of claim 1, wherein the artificial flaw is artificially created in the test composite structure; and
    wherein the first signals used to determine the B-K criteria are for the artificial flaw SERR.

3. The method of claim 2, further comprising subjecting the critical loaded region to qualification test load conditions in response to the embedding of the artificial flaw.

4. The method of claim 1, wherein the B-K criteria is indicative of allowable threshold values for a composite structure.

5. The method of claim 1, wherein the comparing of the second signals further comprises determining whether the second signals are within limits of the B-K criteria of the test composite structure.

6. The method of claim 1, wherein the fitting of the first signals to the B-K curve shape further comprises receiving third signals indicative of SERR values of a predetermined material substantially similar to a material of the test composite structure.

7. The method of claim 1, wherein the receiving of the production composite structure SERR further comprises determining the production composite structure SERR from finite element analysis with virtual closure crack techniques.

8. The method of claim 1, wherein the receiving of the test composite structure SERR further comprises determining the test composite structure SERR from finite element analysis with virtual closure crack techniques.

9. The method of claim 1, further comprising receiving the production composite structure SERR for a critical loaded region with an anomaly.

10. The method of claim 1, wherein the composite structure is a blade.

11. The method of claim 1, wherein the artificial flaw comprises Teflon films, Teflon rods, or planar voids.

12. A system to substantiate safe-life criteria in a composite structure, comprising:
    a processor; and
    memory having instructions stored thereon that, when executed by the processor, cause the system to:
    receive first signals indicative of strain energy release rates (SERR) for an artificial flaw at a critical loaded region of a test composite structure, in response to the artificial flaw being embedded at the critical loaded region of the test composite structure;
    fit the first signals for the flaw SERR to a Benzeggah-Kenane (B-K) mixed mode curve shape;
    determine values indicative of B-K criteria of the test structure in response to the fitting of the first signals;
    receive second signals indicative of SERR for a production composite structure with an anomaly;
    compare the second signals with the B-K criteria of the test composite structure to substantiate the safe-life criteria;
    wherein the production composite structure is used on an aircraft in response to the comparison substantiating that the production composite structure meets the safe-life criteria.

13. The system of claim 12, wherein the artificial flaw comprises embedded Teflon as the embedded test specimen at the critical loaded region.

14. The system of claim 13, wherein the critical loaded region is configured to be subjected to qualification test load conditions.

15. The system of claim 12, wherein the B-K criteria is indicative of allowable threshold values for a test composite structure.

16. The system of claim 12, wherein the processor is configured to determine whether the second signals are within limits of the B-K criteria of the test composite structure.

17. The system of claim 12, wherein the processor is configured to receive third signals indicative of SERR values of a predetermined material substantially similar to a material of the test composite structure.

18. The system of claim 12, wherein the processor is configured to determine the production composite structure SERR from finite element analysis with virtual closure crack techniques.

19. The system of claim 12, wherein the processor is configured to determine the test composite structure SERR from finite element analysis with virtual closure crack techniques.

20. The system of claim 12, wherein the artificial flaw comprises Teflon films, Teflon rods, or planar voids.

* * * * *